(12) United States Patent
Horn

(10) Patent No.: US 7,076,884 B1
(45) Date of Patent: Jul. 18, 2006

(54) APPARATUS AND METHOD TO DETERMINE PINION ANGLE OF DRIVE TRAIN

(76) Inventor: Charles E. Horn, 6001 Charter Oak La. SE., Cedar Rapids, IA (US) 52403

( * ) Notice: Subject to any disclaimer, the term of this patent is extended or adjusted under 35 U.S.C. 154(b) by 0 days.

(21) Appl. No.: 10/936,126

(22) Filed: Sep. 8, 2004

Related U.S. Application Data

(62) Division of application No. 10/630,272, filed on Jul. 30, 2003, now Pat. No. 6,804,897.

(60) Provisional application No. 60/402,442, filed on Aug. 9, 2002.

(51) Int. Cl.
*G01C 9/18* (2006.01)
(52) U.S. Cl. .......................... 33/606; 33/370
(58) Field of Classification Search ............... 33/606, 33/600, 286, 288, 412, 529, 370, 371
See application file for complete search history.

(56) References Cited

U.S. PATENT DOCUMENTS

| | | | |
|---|---|---|---|
| 1,602,698 A * | 10/1926 | Nielsen | 33/286 |
| 2,532,749 A * | 12/1950 | Aurand et al. | 73/865.9 |
| 2,796,673 A * | 6/1957 | Wells | 33/347 |
| 3,071,863 A * | 1/1963 | MacMillan | 33/301 |
| 3,128,554 A * | 4/1964 | Borden | 33/1 N |
| 4,161,068 A * | 7/1979 | McMaster | 33/412 |
| 4,577,413 A * | 3/1986 | Mason | 33/203.18 |
| 5,168,632 A * | 12/1992 | Rimlinger, Jr. | 33/288 |
| 5,513,411 A * | 5/1996 | Simon | 15/111 |
| 5,513,441 A * | 5/1996 | Dennis | 33/370 |
| 5,619,800 A * | 4/1997 | Unruh | 33/203.15 |
| 6,003,238 A * | 12/1999 | Aiken et al. | 33/600 |
| 6,082,190 A * | 7/2000 | Breidenbach et al. | 73/118.2 |
| 6,804,897 B1 * | 10/2004 | Horn | 33/606 |

* cited by examiner

*Primary Examiner*—Diego Gutierrez
*Assistant Examiner*—Amy R. Cohen
(74) *Attorney, Agent, or Firm*—Allen L. Harms

(57) ABSTRACT

Apparatus for use in determining the pinion angle of the differential or transmission of a motor vehicle includes an attachment which is detachably mountable to the input shaft or the output shaft. A camber gauge having longitudinal levels is detachably mounted to the attachment to measure the attitude of the differential or the transmission to which it is mounted.

11 Claims, 7 Drawing Sheets

APPARATUS AND METHOD TO DETERMINE PINION ANGLE OF DRIVE TRAIN

CROSS-REFERENCE TO RELATED APPLICATIONS

This is a division of and claims priority from utility patent application entitled "Apparatus for use in Assembling Drive Train of a Race Car", Ser. No. 10/630,272 filed Jul. 30, 2003, now U.S. Pat. No. 6,804,897, which claimed priority from provisional patent application entitled "Apparatus for Use in Assembling Drive Train of a Race Car", Ser. No. 60/402,442 filed Aug. 9, 2002. The disclosures of utility patent application Ser. No. 10/630,272 filed Jul. 30, 2003, and provisional patent application Ser. No. 60/402,442 are hereby incorporated in their entireties.

STATEMENT REGARDING FEDERALLY SPONSORED RESEARCH OR DEVELOPMENT

Not Applicable.

BACKGROUND OF THE INVENTION

In the assembly of race cars with rear wheel drive with a differential gear in the rear and engine and transmission in the front of the race car, it is necessary to align the axis of the output shaft of the transmission with the input shaft of the differential gear to avoid vibration and to improve performance. Current practice for aligning the axis of the transmission output shaft with the input shaft of the differential gear has been by trial and error and through observations. A need exists for an improved alignment system to facilitate proper positioning of the differential input shaft relative to the transmission when a race car is being assembled.

BRIEF SUMMARY OF THE INVENTION

An apparatus for use in assembling the drive train of a race car is disclosed.

The present invention provides apparatus for use in aligning the differential input shaft of a race car with the transmission output shaft of the race car. With the drive shaft removed from the drive train, a transmission attachment is detachably mountable to the transmission of the race car in place of the drive shaft. The transmission attachment includes a plate mounted to a shaft which extends axially from the plate. The shaft may be coupled with the output shaft of the transmission by its being received on the output shaft of the transmission. A first laser is mounted in a central opening in the plate such that the laser will emit a light beam aligned with the axis of the output shaft of the transmission. The plate includes concentric markings on its face which are centered on the central opening.

A second part of the apparatus is a differential input shaft attachment which may be mounted to the differential input shaft assembly while the drive shaft of the race car is removed from its coupling to the differential gear. The differential input shaft attachment may be mounted to the differential yoke which is coaxially mounted to the input pinion shaft of the differential gear. The differential input shaft attachment includes a plate which is mountable to the differential yoke such that the plate is perpendicular to the axis of the input pinion shaft of the differential. The plate of the differential input shaft attachment has a second laser mounted within a central opening in the plate. The second laser will emit a light beam aligned with the axis of the input pinion shaft of the differential input shaft and directed toward the transmission. The second plate also includes concentric markings on its face which are centered on the central opening.

When the lasers are activated, adjustment of the orientation of the differential input shaft centerline relative to the transmission can be carried out by moving the differential gear or the rear of the transmission to a position where the beams from the first and second lasers are not intersecting. The concentric markings on the plates allow the user to easily assess the distance from the center of the plate at which the opposing laser beam is striking the plate. By introducing a fine dust from a powder such as corn starch or the like into the region between the plates, the laser beams can be observed and adjustment of the differential input shaft can be accomplished to the point where the laser beams do not intersect. With the input shaft of the differential input shaft aligned with or parallel with the output shaft of the transmission of the race car, optimum performance of the drive train is obtained. The first laser may be identical and interchangeable with the second laser and each may emit a red beam. However, lasers which emit differing beam colors may be employed in order to differentiate the laser of the transmission attachment from the laser of the differential input shaft attachment.

The apparatus may also be used to analyze alignment of the differential input shaft to the transmission through the range of vertical motion of the differential input shaft permitted by the race car's suspension. This may be done while the race car remains stationary by mechanically lifting the differential input shaft relative to the race car's chassis while the transmission attachment and the differential input shaft attachment remain temporarily attached to the transmission and the differential input shaft respectively. In this manner, the alignment of the differential input shaft to the transmission output shaft can be inspected throughout the range of vertical motion of the differential input shaft.

In a variation of the invention, either laser may be removed from the central opening of the plate in which it is installed and a target element may be placed in the central opening in its place. The target element has a center indentation or other centered target mark for use when the user desires to reposition the transmission or differential input shaft such that the laser mounted to the one of the gear assemblies is aligned exactly with the axis of the other gear assembly.

In another variation, the laser of either attachment may be removed and replaced with an adapter which allows measurement of the pinion angle of the differential input shaft or the transmission of the race car by mounting a standard camber gauge in axial alignment with the differential input shaft or the transmission output shaft depending on which gear assembly is to be tested. The camber gauge which may be used for this measurement is a typical gauge used to mount to the spindle of a vehicle wheel to measure the camber (tilt from vertical) of the wheel and includes a first transverse level which can be used to place the camber gauge in a horizontal orientation relative to its short axis. A pair of longitudinal elongate bubble levels are positioned parallel to the long axis of the camber gauge and will indicate the decline or incline from horizontal, in degrees, of the shaft of the gear assembly whose attitude is being measured. With the use of this variant of the invention, the pinion angle of the differential input shaft or of the transmission can be compared with the angle present when the differential input shaft and transmission have been accurately aligned by use of the primary system using opposing lasers as described above.

It is a primary object of this invention to provide apparatus for use in accurately aligning the differential input shaft with the transmission of a race car during the assembly of the race car drive train.

It is also an object of the invention: to provide an easily mounted and used apparatus for detection of non-parallel alignment of the output shaft of the transmission with the input shaft of the differential gear of a race car; to provide an adaptable apparatus which permits visual detection at the differential of a race car of an emitted laser beam of a laser aligned with the axis of the output shaft of the transmission of the race car, or to allow visual detection at the transmission of an emitted laser beam of a laser aligned with the input shaft of the differential of the race car; and to provide an adaptable apparatus which permits axial attachment of a camber gauge to the output shaft of a transmission of a race car to measure the pinion angle of the output shaft of the transmission; to provide an adaptable apparatus which permits axial attachment of a camber gauge to the input shaft of a differential gear of a race car to measure the pinion angle of the input shaft of the differential gear.

These and other objects of the invention will become apparent from examination of the description and claims which follow.

BRIEF DESCRIPTION OF THE SEVERAL VIEWS OF THE DRAWING(S)

DETAILED DESCRIPTION OF THE INVENTION

Figure 1:
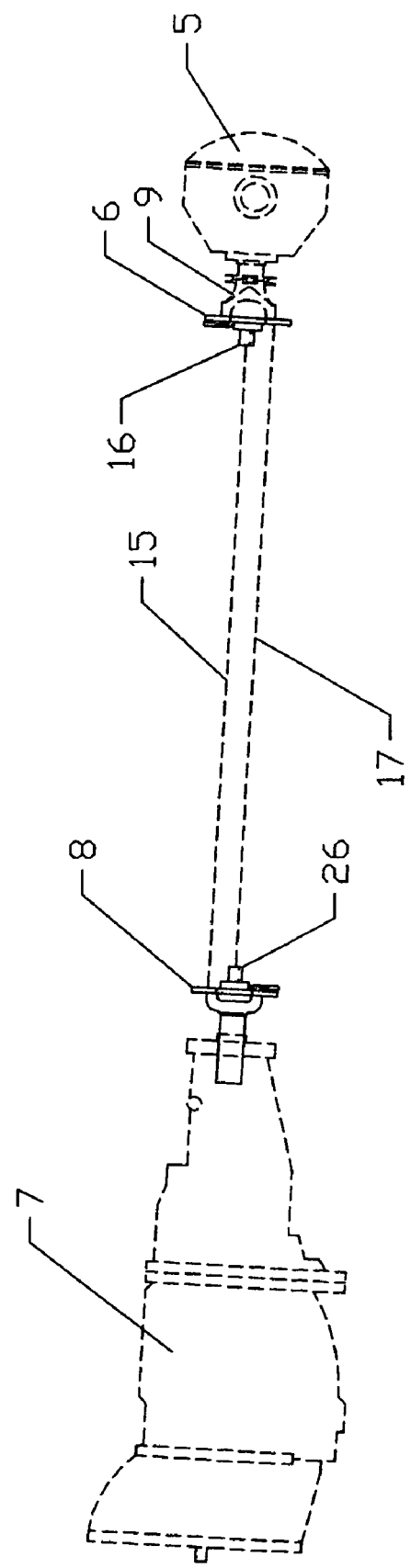
FIG. 1 is a schematic representation of the invention in use to align the differential input shaft with the transmission of a race car.

The present invention provides an apparatus to align the axially rotatable input shaft (not shown) of the differential gear 5 of a race car with the axially rotatable output shaft (not shown) of the transmission 7 of the race car. FIG. 1 illustrates the invention mounted to the transmission 7 and differential gear 5 of a race car. Transmission attachment 8 is detachably mounted to the transmission 7 such that transmission attachment 8 is coupled to the output shaft of the transmission 7 and is coaxial therewith. Differential attachment 6 is detachably mounted to the differential yoke 9 of the differential gear 5 such that differential attachment 6 is coupled to the input shaft of the differential gear 5 and is coaxial therewith. Differential attachment 6 includes laser assembly 16 which selectively emits light beam 15. Transmission attachment 8 includes laser assembly 26 which selectively emits light beam 17. When the differential gear 5 and transmission 7 are properly aligned, light beam 17 will strike differential attachment 6 while light beam 15 will strike transmission attachment 8 and light beams 15 and 17 will not intersect.

Figure 2:
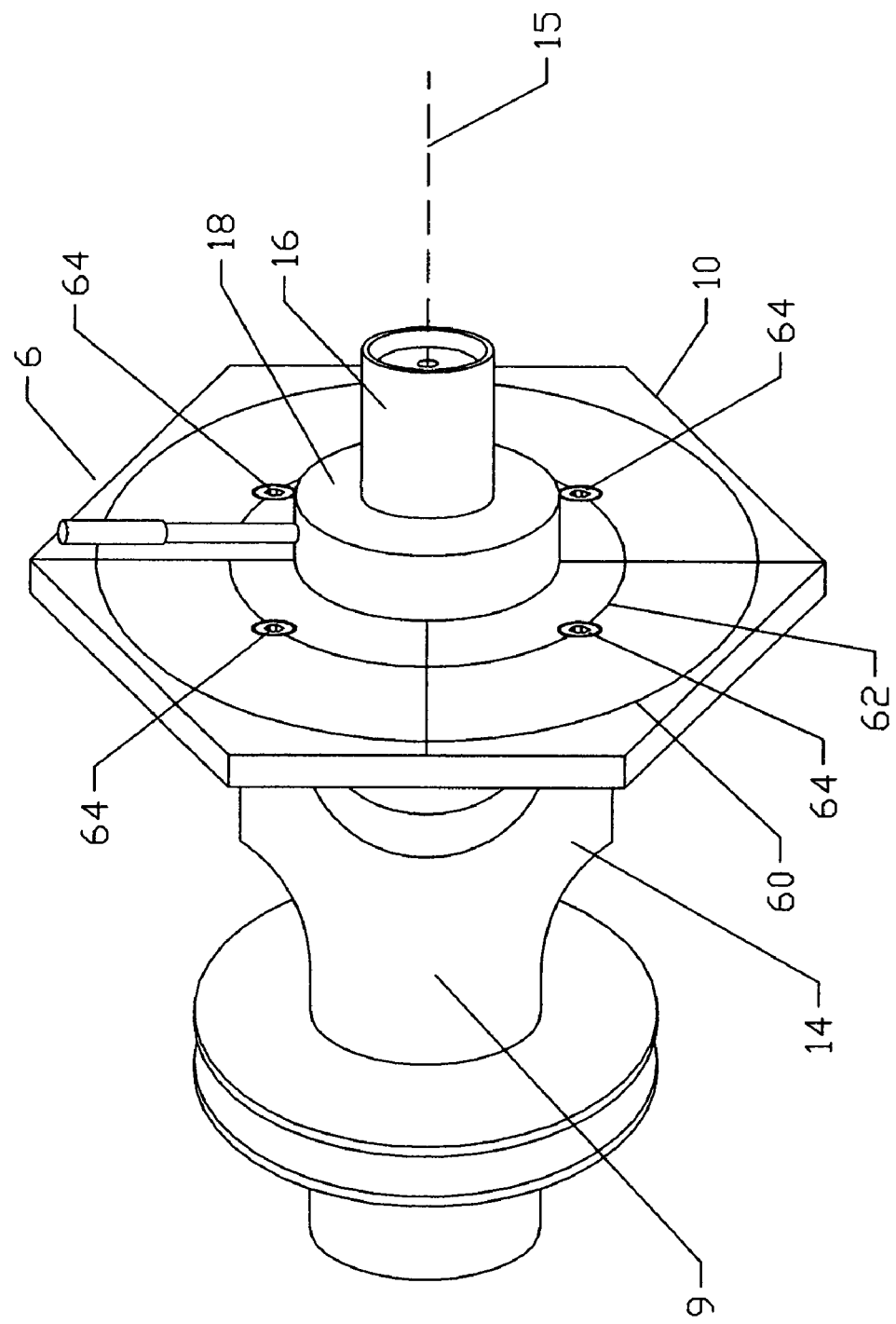
FIG. 2 is a perspective of the differential input shaft attachment of the invention mounted to the differential yoke of a differential gear assembly.
Figure 4:
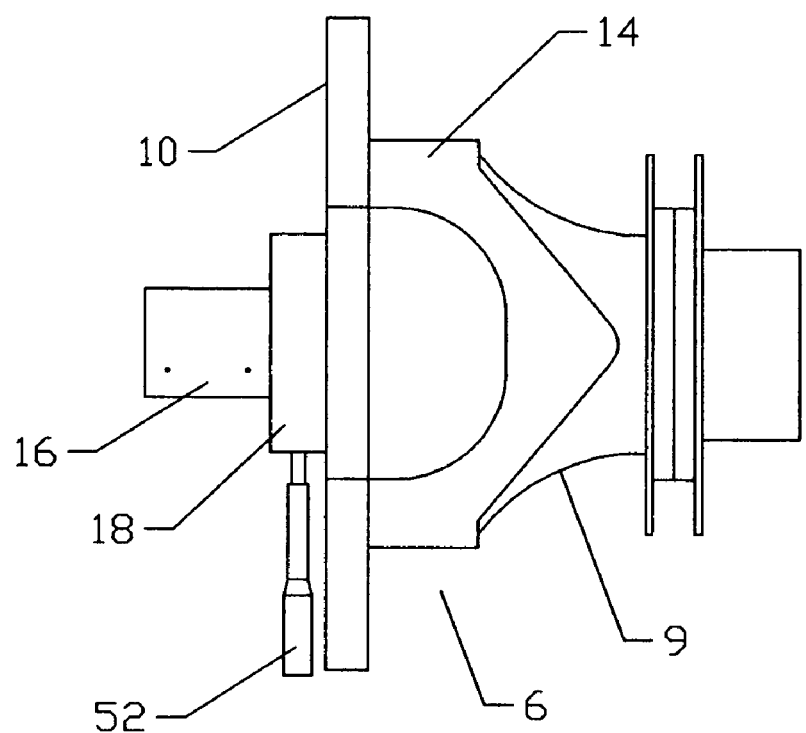
FIG. 4 is a front elevation of the attachment of FIG. 2.
Figure 5:
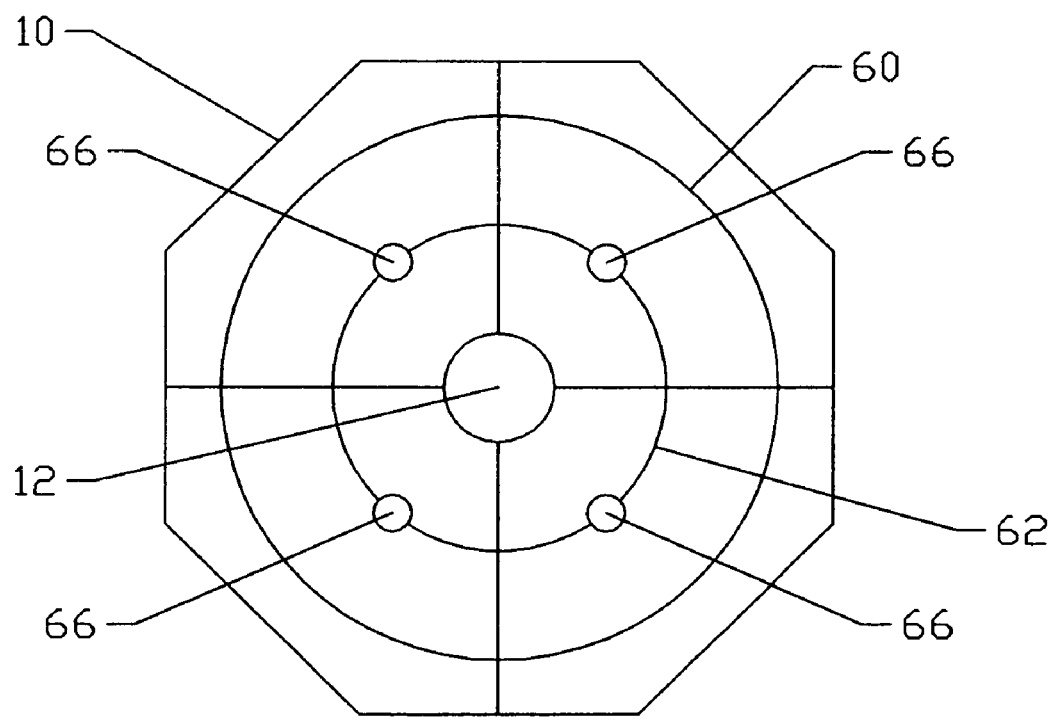
FIG. 5 is a side plan view of the plate member of the attachment of FIG. 2.

Referring now to FIGS. 2, 4, and 5, differential attachment 6 comprises a first plate 10 detachably mounted perpendicularly to differential yoke 9 which is coaxially mounted to the input shaft of the differential gear 5 of the race car. Plate 10 is preferably hexagonal but may be round, octagonal, or another shape. Differential attachment 6 further comprises a first laser assembly 16 which includes a cylindrical body 18 which is mounted to first plate 10, the laser assembly 16 selectively emitting a first light beam 15 directed away from the differential yoke 9 in a direction substantially perpendicular to the plane of the first plate 10 and coaxial with the axis of the differential yoke 9 and the input shaft of the differential gear 5. Plate 10 with first laser assembly 16 mounted thereto may be selectively detachably mounted to yoke element 14 by screws 64 passed through holes 66 in plate 10.

Figure 8:
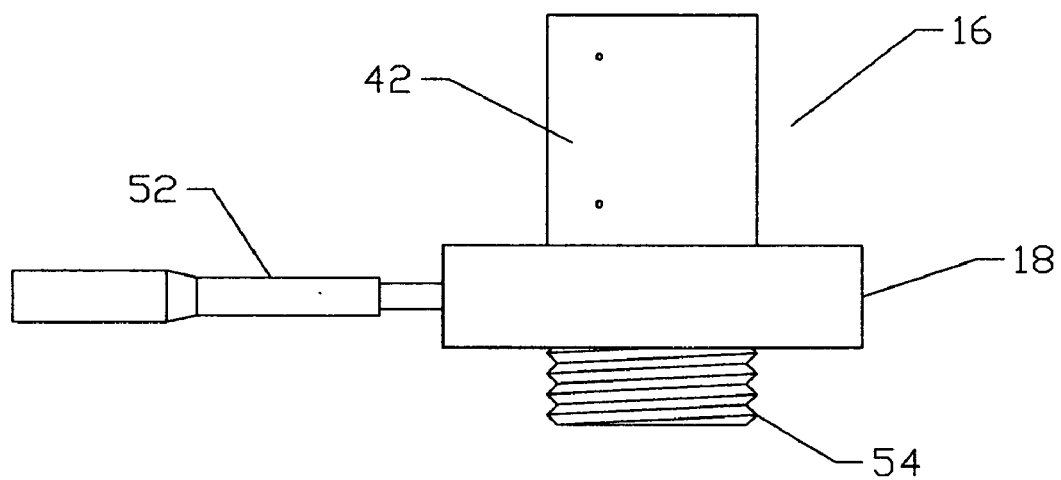
FIG. 8 is a enlarged front elevation of the laser assembly of the attachments of FIGS. 2 and 3.

First laser assembly 16 is illustrated in detail in FIG. 8 wherein it is seen that first laser assembly 16 comprises a laser housing 42 mounted coaxially to cylindrical body 18. Laser housing 42 houses first laser 11. Cylindrical body 18 is provided with a switch handle 52 which may be used to manually activate first laser 11. Cylindrical body 18 includes a threaded extension 54 which is matable with internal threading of the central opening 12 of first plate 10 to mount first laser assembly 16 to first plate 10.

Figure 3:
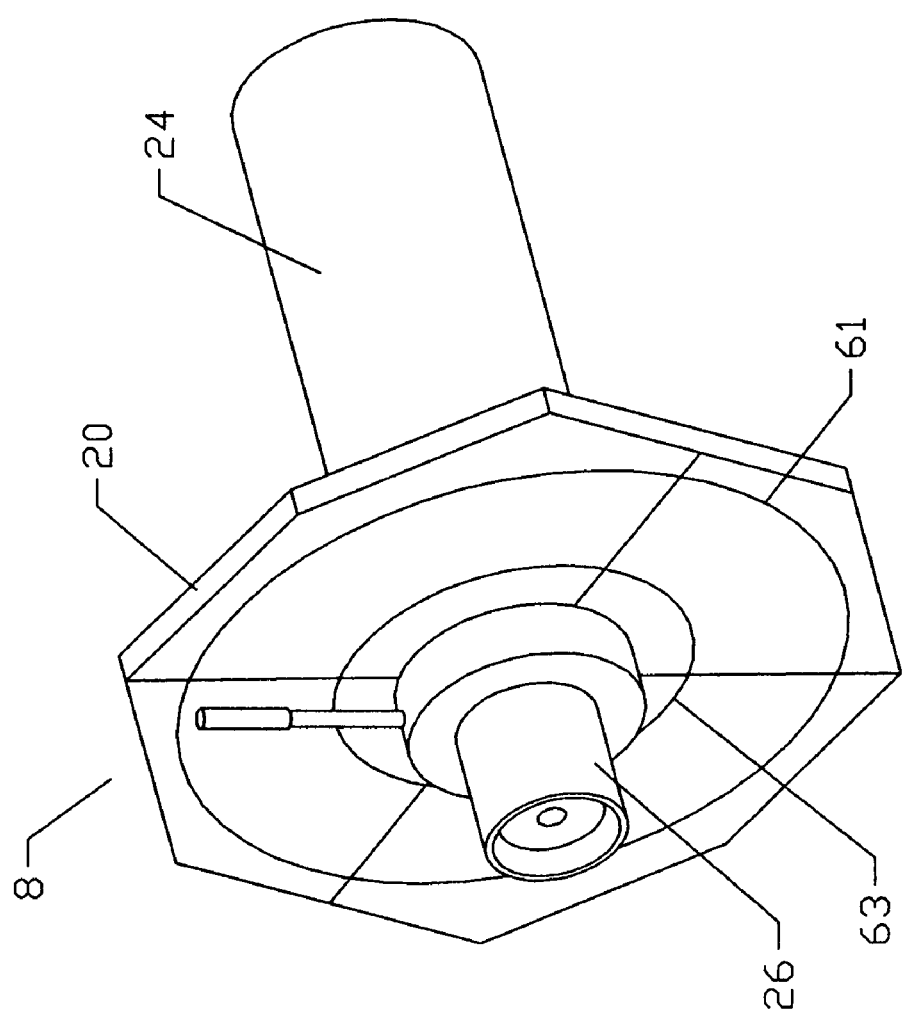
FIG. 3 is a perspective of the transmission attachment of the invention which is detachably mountable to the transmission of a race car.
Figure 6:
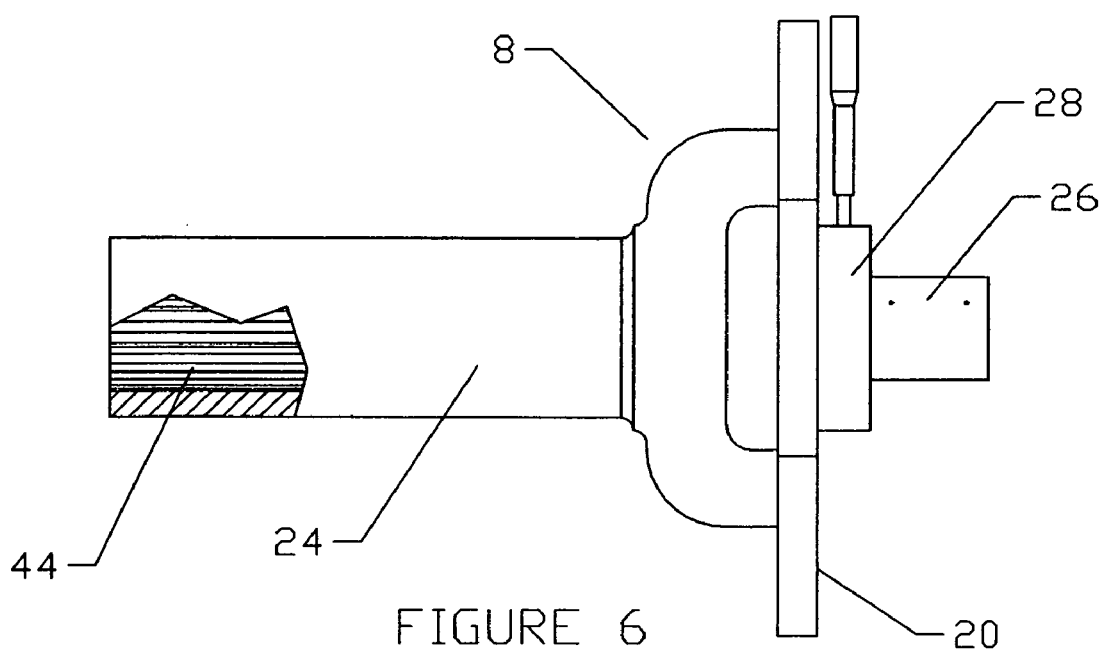
FIG. 6 is a front elevation of the attachment of FIG. 3 with part of the shaft cut away.
Figure 7:
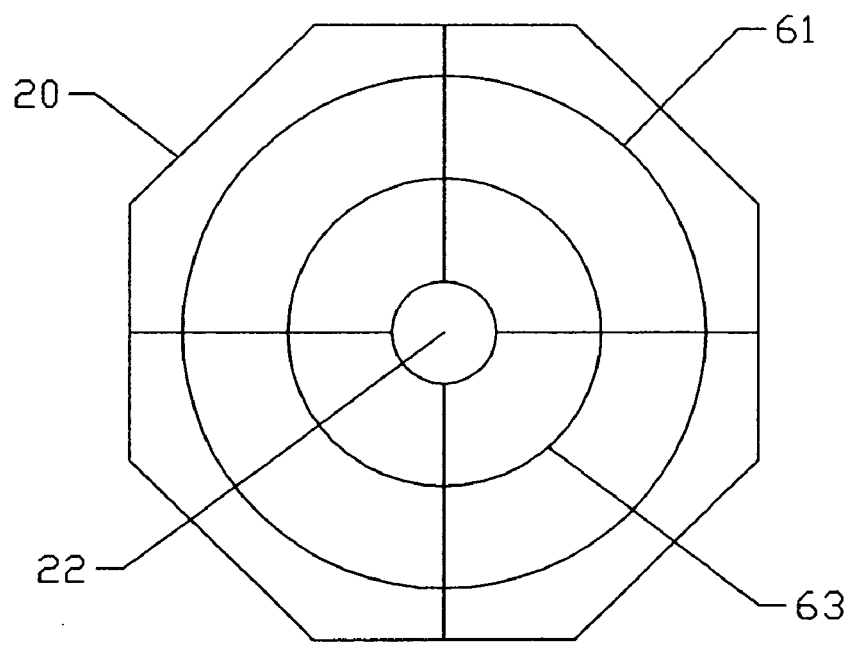
FIG. 7 is a side plan view of the plate member of the attachment of FIG. 3.

Referring to FIGS. 3, 6, and 7, transmission attachment 8 comprises a second plate 20, a second laser assembly 26 and a coupling shaft 24. Second plate 20 may be identical in shape to first plate 10 of differential attachment 6 but need not be. Second plate 20 is mounted coaxially to shaft 24, the shaft 24 receivable coaxially on the output shaft (not shown) of the transmission 7 of the race car. A second laser assembly 26 is mounted coaxially to the second plate 20 and includes a second cylindrical body 28. Second laser assembly 26 is mountable to central opening 22 of second plate 20 as seen in FIG. 7. Second laser assembly 26 is manually operable to selectively emit a second light beam 17 directed away from the transmission, at a substantial perpendicular to the plane of the second plate 20 and coaxial with the shaft 24 which may axially couple to the output shaft of the transmission 7.

Concentric circular markings 60, 62 and 61, 63 may be etched or drawn on plates 10, 20 respectively to provide indication of the impingement of light beams 17, 15 thereon respectively.

Figure 9:
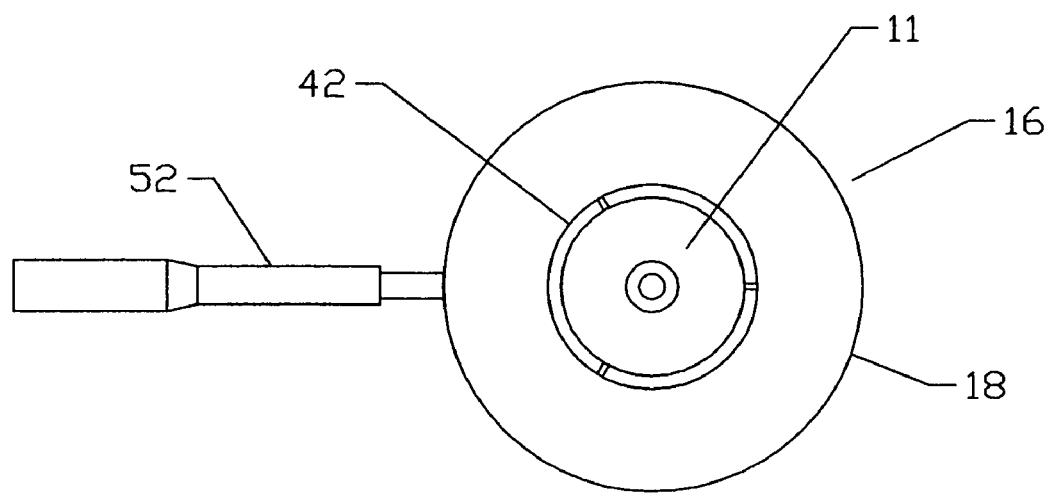
FIG. 9 is a side plan view of the laser assembly of FIG. 8.

It is to be understood that in the preferred embodiment, second laser assembly 26 is physically identical to the first laser assembly 16 seen in FIGS. 8 and 9, though it is not required that each be identical to the other.

In the preferred embodiment, each laser assembly 16, 26 emits a red light beam 15, 17. Alternatively, first laser assembly could emit light beam 15 of a different color than the color of light beam 17 of second laser assembly 26.

The differential attachment 6 may be selectively mounted to the input shaft of the differential gear 5 of the race car by mounting plate 10 to the yoke element 14 of the differential yoke 9 of differential gear 5. The transmission attachment 8 may be selectively coupled to the output shaft of the transmission 7 by sliding the coaxial shaft 24 onto the transmission output shaft (not shown), splines 42 therein meshing with complementary splines on transmission output shaft. Plates 10, 20 serve as targets for light beams 17, 15. The first light beam 15 from the first laser assembly 16 is directed toward the second plate 20 when the first laser 15 is activated. The second light beam 17 from the second laser assembly 26 is directed opposingly to the first light beam 15 to preferably strike the first plate 10. If transmission 7 and differential gear 5 are in general alignment, first light beam 15 will strike second plate 20 and second light beam 17 will strike first plate 10.

The differential attachment 6 may be mounted to the differential yoke 9 contemporaneously with mounting of the shaft 24 of transmission attachment 8 to the transmission output shaft of transmission 7. Both first laser assembly 16 and second laser assembly 26 may then be activated and a fine particulate such as a powder (for example, corn starch) may be introduced into the space between the first plate 10 and second plate 20. When the laser assemblies 16, 26 are activated, the light beams 15, 17 from each laser assembly 16, 26 may be observed as they strike the fine particulate and as they strike the opposing plates 20, 10. The differential input shaft orientation may be adjusted such that the beams 15, 17 from the laser assemblies 16, 26 are parallel if not coincident. By avoiding convergence or intersection of the two light beams 15, 17 between first and second plates 10, 20, desired alignment of the differential gear 5 to the transmission 7 may be achieved.

While transmission attachment 8 remains mounted to the output shaft of transmission 7 of the race car and while differential attachment 6 remains mounted to the input shaft of differential gear 5, the user may mechanically raise the differential gear 5 relative to the race car chassis or raise the race car chassis relative to the rear axle of the race car to determine if the alignment of the differential gear 5 to the transmission 7 remains satisfactory throughout the vertical range of motion of the differential gear 5. The laser assemblies 16, 26 may be activated at any stage of the lifting of the differential gear 5 or the race car chassis to determine whether the light beams 15, 17 intersect and if so, further adjustment may be undertaken to properly align the differential gear 5 to the transmission 7.

Figure 10:
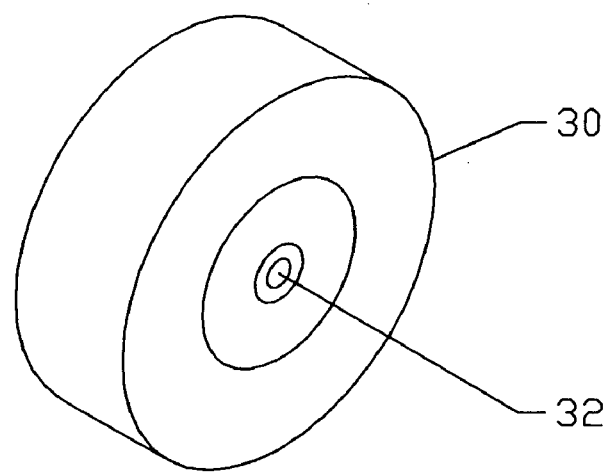
FIG. 10 is an enlarged perspective of a target member which may be substituted for the laser assembly of the attachments of FIGS. 2 and 3.

If desired, one of laser assemblies 16, 26 may be replaced with a target fixture 30 such as that shown in FIG. 10. On its rear face, target fixture 30 includes a threaded stub (not shown) which may be received in central opening 12, 22 of either first or second plates 10, 20. The target fixture 30 includes a central target point such as indentation 32 to provide a target location for the opposing laser aimed at target fixture 30.

Figure 11:
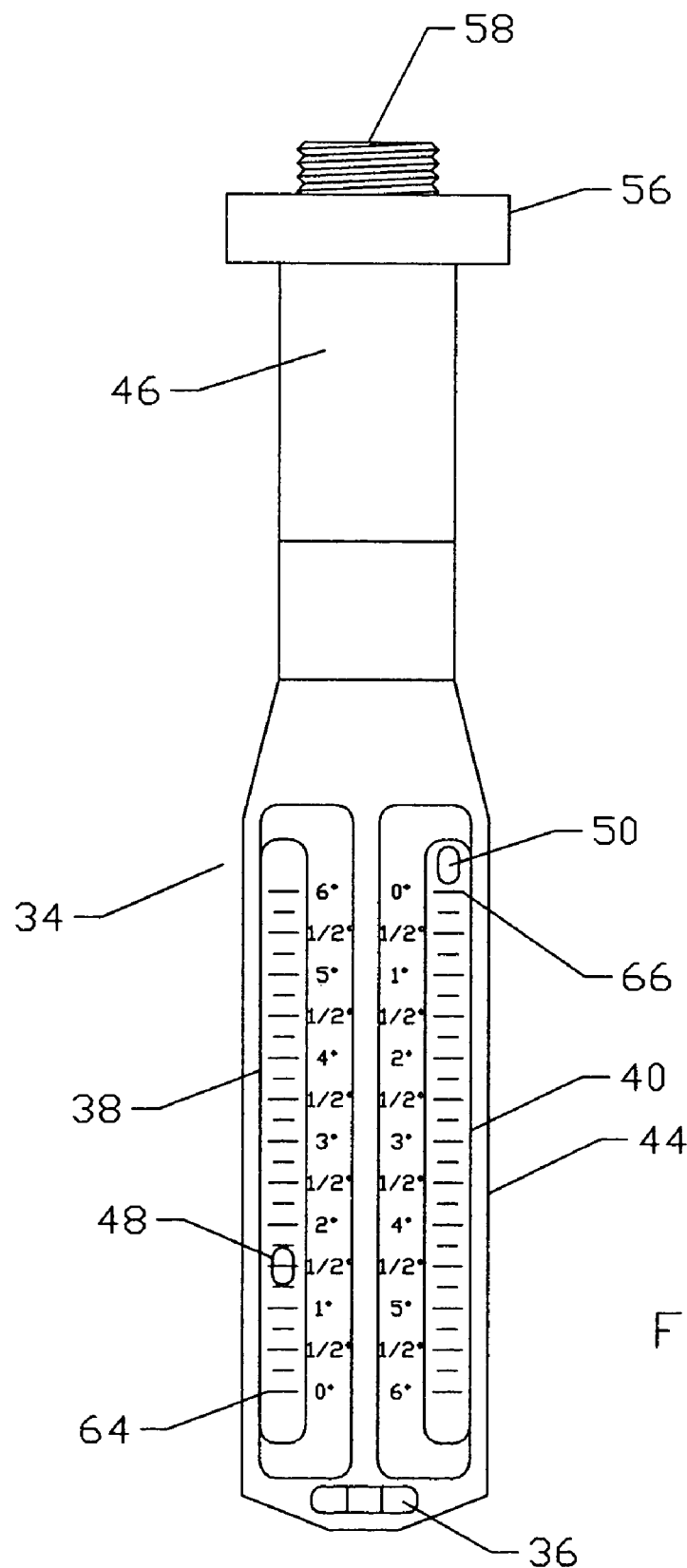
FIG. 11 is a top plan view of a camber gauge which may be mounted in place of the laser assembly of the attachments of FIGS. 2 and 3.

In an optional embodiment, either laser assembly 16, 26 may be removed from its plate 10, 20 and, either plate 10, 20 may be fitted with a gauge 34 such as a camber gauge commonly used for adjusting camber of a front wheel of a vehicle. In the optional embodiment, gauge 34 may be used to measure the pinion angle of either the input shaft of the differential gear 5 or the output shaft of the transmission 7 of the vehicle. Referring to FIG. 11, it is seen that the gauge 34 includes a transverse bubble level 36 and longitudinal first and second elongate bubble levels 38 and 40. Elongate bubble levels 38, 40 are positioned substantially parallel to each other on the body 44 of gauge 34. Transverse bubble level 36 permits gauge 34 to be horizontally leveled on its short axis. First elongate level 38 is mounted on body 44 such that when the gauge 34 is in a position declining from horizontal relative to its mounting end 46 (as illustrated in FIG. 11), the bubble 48 of first level 38 will be located along the scale or at least spaced away from the 0° mark 64 of first level 38. Second elongate level 40 is mounted such that when the gauge 34 is in a position ascending from horizontal relative to its mounting end 46, the bubble 50 of second level 40 will be located along the scale or at least spaced from the 0° mark 66 of second level 40. When gauge 34 is maintained in an exact horizontal orientation both longitudinally and transversely, each of bubbles 48 and 50 will be at the respective 0° marks 64, 66 on first and second levels 38, 40 respectively.

Gauge 34 may be secured at its mounting end 46 to an adapter 56 which includes threaded bolt 58 which is receivable in central opening 12 of either first plate 10 or second plate 20. First plate 10 with gauge 34 attached may be temporarily mounted to yoke element 14 of input shaft 9. Gauge 34 may be used to measure the cant from horizontal (the pinion angle) of the input pinion shaft of the differential gear 5 because the differential yoke 9 to which first plate 10 is mounted is axially coupled to the input shaft of the differential gear 5. When used with first plate 10, gauge 34 allows easy inspection for spacial orientation of the input shaft 9 of differential gear 5 to detect misalignment which may occur during transport or operation. If gauge 34 indicates that the attitude of the input shaft of differential gear 5 has changed from that set from use of first and second laser assemblies 16, 26 as described above, then the gauge 34 may be removed from the first plate 10 and the laser assembly 16 may be remounted in central opening 12 of first plate 10 and transmission attachment 8 may be mounted to the transmission output pinion shaft and aligning operations may be repeated.

Gauge 34 may also be substituted for laser assembly 26 of transmission attachment 8 in order to measure the attitude of the transmission 7 in the same manner as described above for using gauge 34 with differential attachment 6.

Many variations of the invention will be apparent to those skilled in the art. It is therefore to be understood, that within the scope of the appended claims, the invention may be practiced other than as specifically described.

I claim:

1. Apparatus to determine pinion angle comprising
    an elongate gauge detachably mounted to extend from a rotatable shaft of a gear assembly of a drive train of a race car,
    the gauge having a longitudinal axis substantially coaxial with a longitudinal axis of the rotatable shaft,
    the gauge mounted to a plate,
    the plate substantially perpendicular to the longitudinal axis of and detachably mounted to the rotatable shaft,
    the gauge including a pair of elongate levels generally parallel to the axis of a gauge,
    the gauge including linear markings along each elongate level to indicate degrees of incline or decline,
    whereby the pinion angle of the gear assembly may be observed on the gauge.

2. The apparatus of claim 1 wherein the gauge has a transverse bubble level.

3. The apparatus of claim 1 wherein the gauge comprises a camber gauge.

4. Apparatus to determine pinion angle of a component of a drive train comprising
- an elongate gauge detachably mounted to either an output shaft of a transmission or an input shaft of a differential gear of a motor vehicle,
- the output shaft and the input shaft each having a longitudinal axis,
- the gauge having a longitudinal axis substantially coaxial with the longitudinal axis of the shaft to which the gauge is mounted,
- the gauge mounted to a plate,
- the plate substantially perpendicular to the longitudinal axis of and detachably mounted to the output shaft or the input shaft,
- the gauge including a pair of elongate levels generally parallel to the axis of the gauge,
- whereby the pinion angle of the shaft to which the gauge is mounted may be observed on the gauge.

5. The apparatus of claim 4 wherein the gauge includes a transverse bubble level.

6. The apparatus of claim 4 wherein the gauge comprises a camber gauge.

7. Apparatus to determine pinion angle of a shaft comprising
- a gauge detachably mounted to extend from an output shaft of a transmission of a motor vehicle,
- the gauge having a longitudinal axis substantially coaxial with the output shaft,
- the gauge mounted to a plate,
- the plate substantially perpendicular to a longitudinal axis of and detachably mounted to the output shaft,
- the gauge including at least one indicator responsive to the incline or decline from horizontal of the output shaft.

8. The apparatus of claim 7 wherein
- the gauge further comprises a pair of longitudinal elongate bubble levels and a transverse level.

9. Apparatus to determine pinion angle of a shaft comprising
- a gauge detachably mounted to extend from an input shaft of a differential gear of a motor vehicle,
- the gauge having a longitudinal axis substantially coaxial with the input shaft,
- the gauge mounted to a plate,
- the plate substantially perpendicular to a longitudinal axis of and detachably mounted to the input shaft,
- the gauge including at least one indicator responsive to the incline or decline from horizontal of the input shaft.

10. The apparatus of claim 9 wherein
- the gauge further comprises a pair of longitudinal elongate bubble levels and a transverse level.

11. A method to measure pinion angle of a drive train component comprising the steps of detachably mounting a gauge assembly to one of a transmission output shaft and a differential input shaft of a motor vehicle, the gauge assembly comprising an elongate camber gauge and a plate substantially perpendicular to a longitudinal axis of the elongate camber gauge, aligning the longitudinal axis of the camber gauge to be substantially coaxial with a longitudinal axis of the one of the transmission output shaft and the differential input shaft wherein the plate is detachably mounted to one of the transmission output shaft and the differential input shaft, adjusting the elongate camber gauge so that it is transversely aligned with horizontal, reading the pinion angle by observing bubble levels on the elongate camber gauge.

* * * * *